June 13, 1950     C. A. DE GIERS ET AL     2,511,398
FLOAT CONTROLLED CAPACITOR TRANSMITTER
Filed July 17, 1945     3 Sheets-Sheet 1
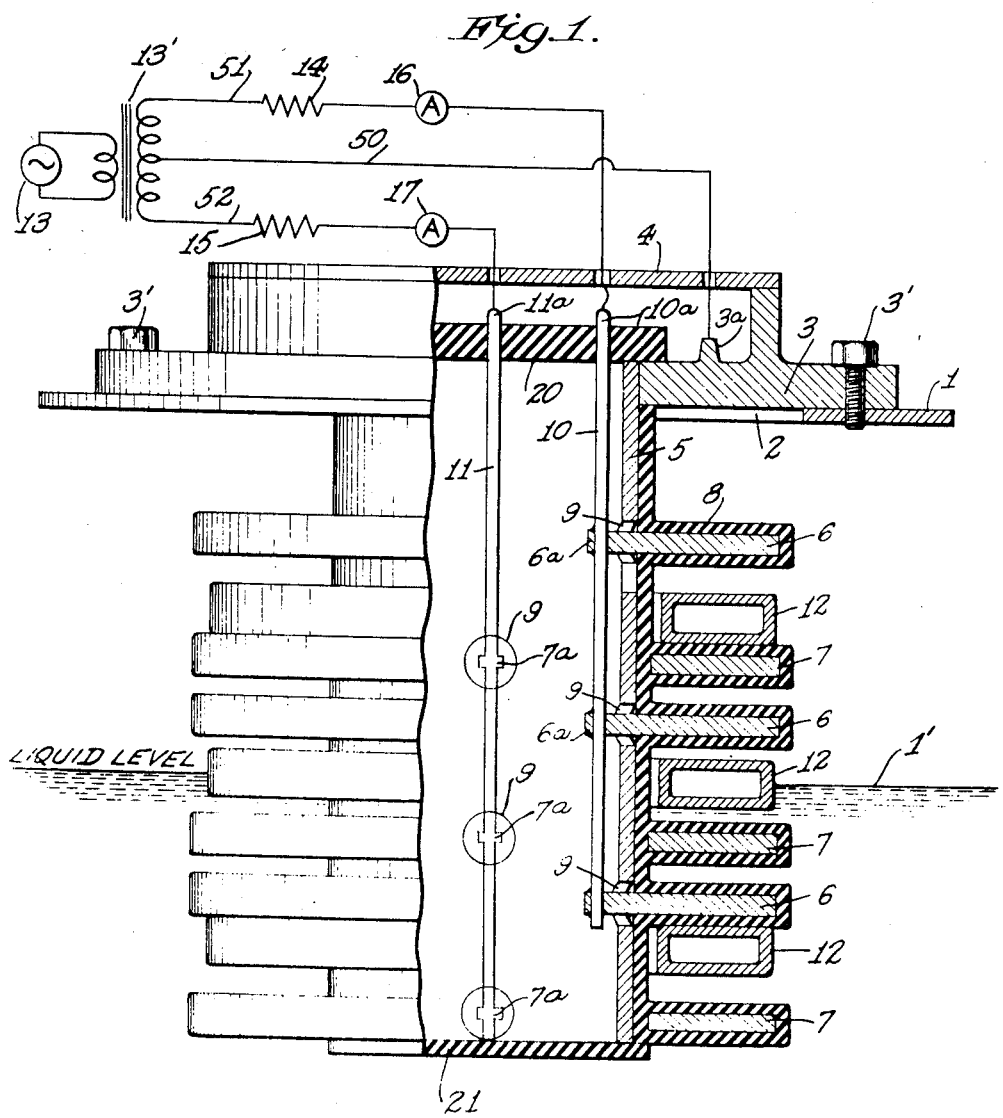
INVENTORS
CLARENCE A. DE GIERS
ABRAHAM EDELMAN
BY
Ernest D. Given
ATTORNEY

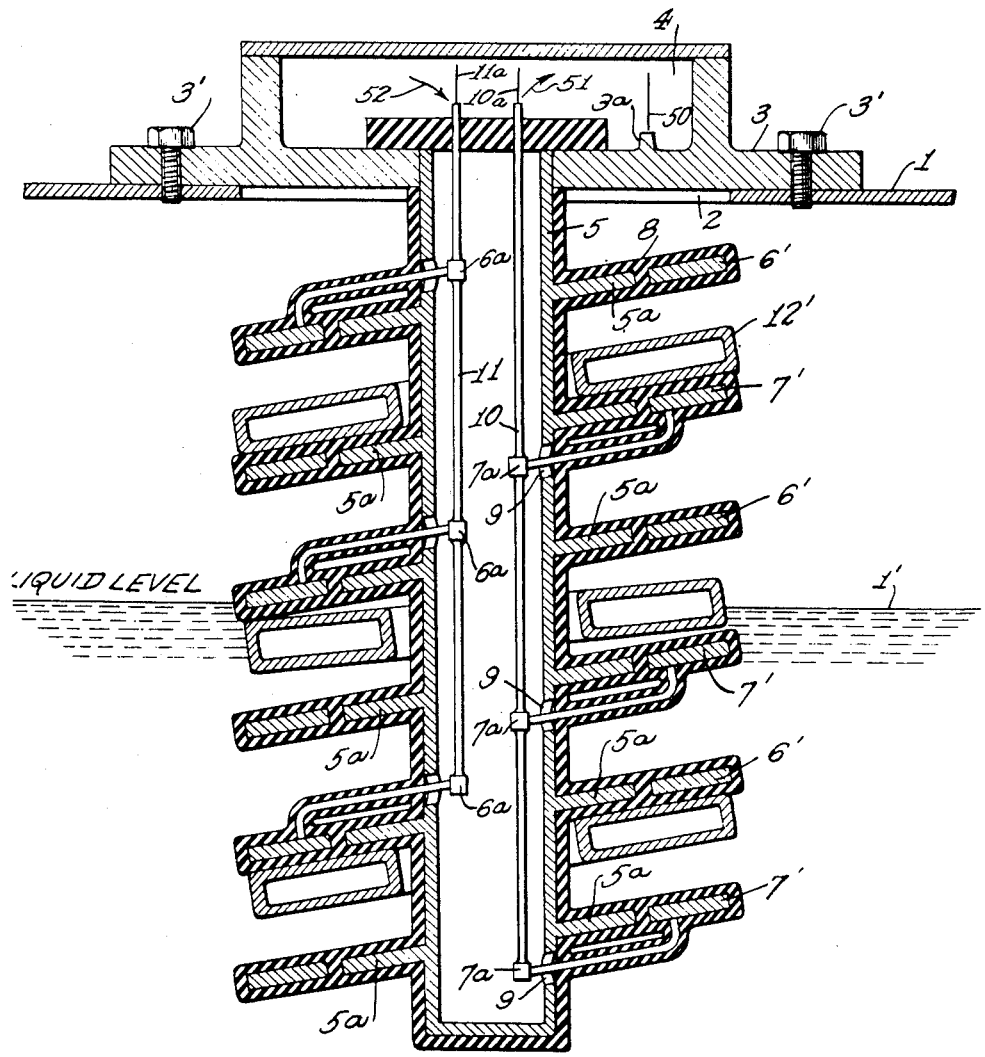

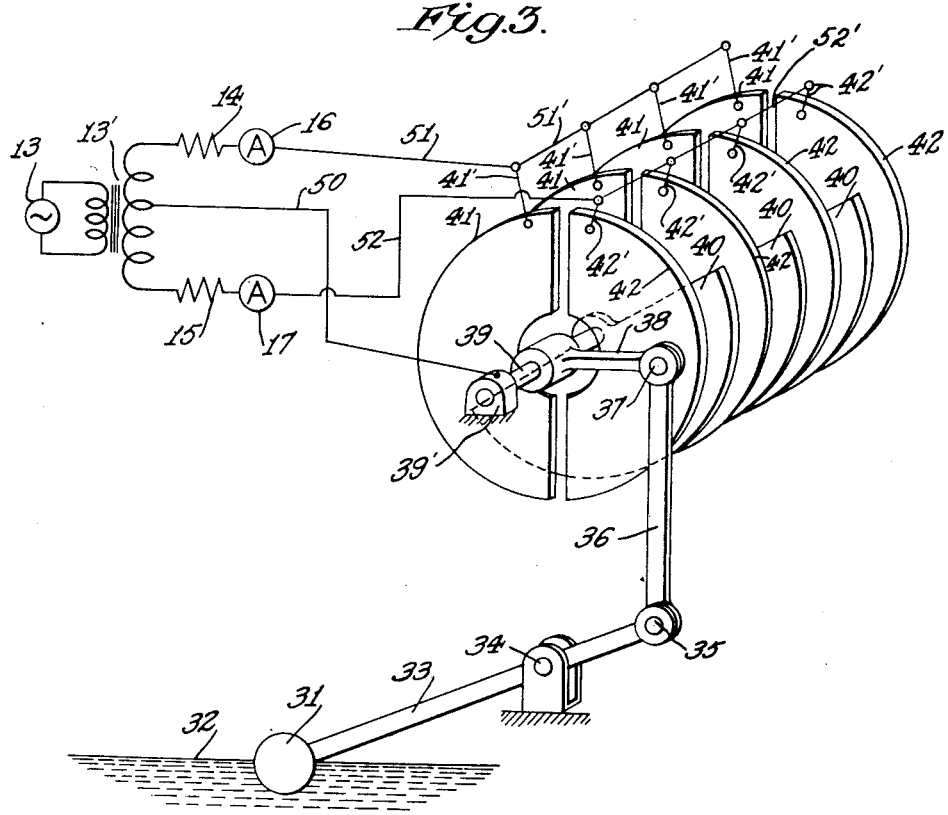

Patented June 13, 1950

2,511,398

UNITED STATES PATENT OFFICE 2,511,398

FLOAT CONTROLLED CAPACITOR TRANSMITTER

Clarence A. de Giers, Forest Hills, and Abraham Edelman, New York, N. Y., assignors to The Liquidometer Corporation, Long Island City, N. Y., a corporation of Delaware Application July 17, 1945, Serial No. 605,536

11 Claims. (Cl. 175—41.5)

This invention relates to liquid level measuring devices employing floats and more specifically to transmitters of such level measuring devices in which the capacitance value of a capacitor in the transmitter is controlled by changes of the liquid level to be supervised and is employed to control a receiver.

One of the objects of the invention is to provide a novel and improved transmitter in which the signals transmitted by the transmitter to the receiver are characteristic of the liquid level notwithstanding different electrical properties of the fluid, the level of which is to be supervised.

Another object of the invention is to provide a novel and improved transmitter of the type described in which the floats, the positions of which are controlled by the liquid level, do not have to overcome frictional resistance as is the case when the floats are caused to work a mechanical system, for instance, to move a slider on a resistor; hence the floats will follow very accurately any change of the liquid level.

Another object of the invention is to provide a novel and improved transmitter in which the capacitance value of the capacitator included in the transmitter is controlled by changes of the liquid level to be supervised without exposing the electrodes of the capacitator to contact with the liquid to be supervised. Such arrangement is of particular value when the liquid level of a combustible liquid, such as gasoline, is to be measured.

Another object of the invention is to provide a novel and improved transmitter in which floats are arranged in capacitative relationship to two fixed electrodes, which relationship is varied as a result of changes in the level of the liquid, thereby creating a balanced system in which various errors frequently found in conventional remote indication systems are eliminated.

Another object of the invention is to provide a novel and improved transmitter in which the floats are connected only capacitatively with stationary parts of the transmitter, thereby eliminating the necessity of connecting the floats to the circuit system by wires in contact with the liquid. This has the advantage that any danger of fire by short circuited wires or sparks is avoided.

Other and further objects, features and advantages of the invention will be hereinafter set forth and the novel features thereof defined by the appended claims.

In the accompanying drawings several now preferred embodiments of the invention are shown by way of illustration and not by way of limitation.

In the drawings:

Fig. 1 is an elevational side view of a measuring device according to the invention, the transmitter of the device being partially shown in section;

Fig. 2 is a vertical sectional view of a modification of a transmitter according to the invention; and Fig. 3 is a diagrammatic view of a measuring device according to the invention, showing a second modification of the transmitter in perspective illustration.

Referring now to Fig. 1 this figure illustrates a transmitter according to the invention, mounted in a tank 1 containing a liquid and having an opening 2. (Only a section of the tank walls is shown.) A flange 3 is fastened over the opening by means of screws 3' and supports exteriorly an electrical connection box 4, and interiorly a metal tube 5. Metal rings 6 and 7 surround the metal tube at spaced intervals, being supported in an insulated relationship to the tube by an insulation substance 8, coating tube 5 and rings 6, 7, so that tube 5 and rings 6, 7 are at no point in direct contact with the liquid, thereby eliminating all danger of fire by sparks in case of combustible liquids, such as gasoline. Rings 6 and 7 are equipped with one terminal lug for each ring, as shown inside the metal tube at 6a and 7a. The terminal lugs 6a and 7a enter the metal tube through holes 9 which are dimensioned to prevent electrical contact between the rings and the metal tube 5. All of the terminal lugs 6a are connected together by a rod or wire 10 terminating in a terminal 10a inside the connection box 4. All of the terminal lugs 7a likewise are connected together by a rod or wire 11 terminating in a terminal 11a inside the box. Tube 5 is closed at both ends by insulating blocks 20, 21. The metal tube 5 is electrically grounded to flange 3, and electrical connection to it may be made by a terminal 3a.

Metal rings 6 alternate with metal rings 7 throughout the height of the metal tube 5, the total number of such rings being in proportion to the length of the metal tube 5. The length of the metal tube is nearly equal to the depth of the tank 1, the liquid contents of which it is desired to measure. Metal ring floats 12 are placed between pairs of metal rings 6 and 7, but always in such location that a ring 6 is above a float 12 and a ring 7 below a float. The inner diameter of a float 12 is slightly larger than the outer diameter of the insulating coating 8 surrounding tube 5. Those floats that are below the level of a liquid 1' contained within the tank 1 are held against the lower side of rings 6 by their own buoyancy; and those floats that are above the level of the liquid rest against the upper side of rings 7, due to their weight. One float 12 is shown in Fig. 1 below the liquid level, and another float 12 is shown above the liquid level to illustrate this. A third float 12 is shown in a midway position in which it is just floating on the liquid level 1'.

From an electrical viewpoint, each float forms one electrode of three variable capacitances, the other electrodes of which are formed by respective metal rings 6, 7 and adjacent sections of tube 5. The capacitances values of these capacitances are dependent upon the location of the floats 12 relative to the respective rings 6, 7 and the respective tube section 5. The capacitance between a float 12 and tube 5 will not be affected substantially by the position of a float relative to coacting rings 6, 7 since the slight clearance between a float 12 and the insulation 8 on tube 5 does not permit the float to vary far from concentricity with tube 5. However, the capacitances between a float 12 and the coacting metal rings 6, 7 are clearly controlled by the position of the float relative to the rings, since the capacitance between either metal ring and the float will increase as they approach each other. Consequently, the capacitance between the tube 5 and a ring 6 is larger when a float 12 is near the ring 6 as illustrated for the float below liquid level 1' and is smaller when the float is near a ring 7 as illustrated for the float above liquid level. It will, of course, be understood that this capacitance change between tube 5 and a ring 6 is actually the combined effect of two capacitances in series, to wit, between the tube 5 and the float, and between the float and ring 6. In an analogous, but opposite manner, the capacitance between the tube 5 and a ring 7 is large when the float is near to ring 7, as illustrated above the liquid level, but is smaller when the float is near to ring 6, as illustrated below the liquid level. Thus, the change in the location of the float 12 in its space will cause opposite changes in the capacitance from tube 5 to each of the rings 6 and 7 respectively. Furthermore, since all of the rings 6 are connected so that their capacitance to tube 5 is in parallel, and since similarly all of the rings 7 are connected so that their capacitance to tube 5 is in parallel, it is clear that for an empty tank, the entire capacitance between tube 5 and rings 7 is large; and that as the tank fills, lifting the floats one after another away from rings 7, this capacitance will diminish, in steps. Also, that during the same sequence from empty tank to full tank, the capacitance from the tube to rings 6 will start at a low value and increase in steps to an equivalent degree but in opposite manner. As will be obvious, all float movements are free of any frictional resistance.

It will now be apparent that the capacitances between the tube and rings 6, and the capacitances between the tube and rings 7, may both be used as a measure of the location of the liquid surface, either separately or in combination. When both are used some errors of the measuring system may be canceled out. Any suitable measuring and/or indicating system responsive to changes in capacitance may be employed as a receiver. A simple but practical system will now be explained.

The system comprises a center-tapped source of alternating current, such as an A.-C. generator 13 and a transformer 13', the center of the secondary of which is grounded by a wire 50, connected to terminal 3a. The term "grounded" is here used to indicate merely connection to the tank 1, and also to suggest that this would be a proper reference level of potential. One outer terminal of the secondary is connected by a wire 51 through an impedance 14 to terminal 10a, and the other outer terminal of the secondary is connected by a wire 52 through an impedance 15 to terminal 11a. The current through each of the impedances 14 and 15 will be determined by the capacitances in series, the applied voltage, the frequency, the value of the impedances and the temperature, since temperature will influence some of these magnitudes. However, the currents through both impedances will be similarly influenced by the applied voltage, frequency, and ambient temperature so that a relationship between the currents, such as their ratio, will be relatively free of any influence due to them. Thus, any means such as ammeters 16, 17 included in wires 51, 52 respectively, may be employed to measure the current through the impedances simultaneously; and then by the use of a simple calculation, such as the calculation of their ratio, the level of the liquid in the tank may be determined without error resulting from various external causes. Of course, various electrical circuits, such as electronic voltmeters, may also be used for the measurement, and they may be so interconnected with each other as to furnish the ratio directly upon an indicator; but this is not a part of the present invention.

Fig. 2 illustrates a modification of Fig. 1 in which like reference characters are employed to designate corresponding parts. The device according to Fig. 2, is distinguished from the one shown in Fig. 1, by providing fins 5a on the tube 5. Rings 6' and 7' corresponding functionally to rings 6 and 7 respectively are supported concentrically with the fins 5a and electrically connected by wires to terminal lugs 6a and 7a. All these parts are coated with insulating material 8 which electrically separates the fins and the rings and also prevents direct contact between liquid and tube 5 with its fins 5a and rings 6', 7'. The floats 12' are shaped somewhat flatter than those shown in Fig. 1 and vary the capacitance between fins 5a and rings 6', and also the capacitance between fins 5a and rings 7' as explained in connection with Fig. 1. Furthermore, the fins 5a are placed at an angle to the metal tube 5, as are the rings 6', 7', and the floats 12. Because of this angular position, floats 12' will rise and sink more gradually than floats 12 as the liquid level changes, thereby diminishing the somewhat steplike character of the change in capacitance with liquid level effected by the device according to Fig. 1. Furthermore, due to the flatter design of floats 12', more floats per foot of tank height may be employed, thereby reducing the size of the individual steps.

The transmitter may be connected to a circuit system such as is shown in Fig. 1.

Fig. 3 illustrates still another modification of the invention. In this arrangement, a float 31 floating on a varying liquid level 32 supports one end of an arm 33 which is pivoted intermediate its ends at a fixed pivot 34. The other end of arm 33 is pivoted at 35 to a connecting rod 36, which in turn is pivoted at 37 to a crank arm 38. A shaft 39 carries and is rotated by this crank arm, and thereby will rotate semi-circular capacitor plates 40, which are fastened on the shaft and spaced between fixed semi-circular capacitor plates 41 and 42. Shaft 39 is rotatably supported by fixed bearings such as bearing 39' or any other suitable fixed means of support. As all capacitor plates are semi-circular it will be apparent that any change in the capacitance between movable plates 40 and fixed plates 41 will be approximately equal and opposite to a simultaneous change in the capacitance between movable plates 40 and the fixed plates 42. All plates 41 are connected in parallel by wires 41' to a common wire 51', which in turn is connected to wire 51. All plates 42 are connected by wires 42' to a common wire 52', which in turn is connected to wire 52. Wires 51 and 52 connect the transmitter according to Fig. 3, to an indicating and/or measuring system as has been shown in Fig. 1 and described in connection therewith. The center point of the secondary of transformer 13' is grounded by connecting it by wire 50 to bearing 39'.

It will be understood and has been previously mentioned, various types of conventional receiver systems responsive to capacitative changes may be employed.

While the invention has been described in detail with respect to certain particular preferred examples and embodiments, it will be understood by those skilled in the art after understanding our invention that various changes and modifications may be made without departing from the spirit and scope of our invention, and it is intended therefore, in the appended claims to cover all such changes and modifications.

What is claimed is:

1. A transmitter of the capacitance type for a liquid level measuring device of the class described, comprising a fixed electrode adapted to be placed in said liquid, and a movable electrode consisting of a conductive float resting on the liquid the level of which is to be measured and arranged to change its position relative to the fixed electrode in response to a change of the liquid level for varying the capacitance between the electrodes is a function of the liquid level.

2. A transmitter of the capacitance type for a liquid level measuring device, comprising a fixed electrode adapted to be immersed in the said liquid dependent upon the level thereof, a second fixed electrode adapted to be immersed in the said liquid dependent upon the level thereof, means electrically insulating both said fixed electrodes from the liquid and from each other, and a metal float which is always separated from said fixed electrodes by said insulating means and which rests on the liquid, the level of which is to be measured, and is arranged to change its position relative to the said fixed electrodes in response to a change of the liquid level to be measured for varying the capacitance values between the electrodes as a function of the liquid level.

3. In a liquid level measuring device, a transmitter of the capacitance type comprising a fixed electrode adapted to be placed in the said liquid, a second fixed electrode adapted to be placed in the said liquid, one of said fixed electrodes having several sections arranged to form, together with the other fixed electrode, a plurality of open compartments, and a plurality of conductive floats, one float placed in each of said compartments, said floats being adapted to float on the liquid level to be measured and changing their positions relative to said fixed electrodes in response to a change of the liquid level, thereby varying the capacitance values between the electrodes as a function of the liquid level.

4. In a liquid level measuring device, a transmitter of the capacitance type comprising two fixed electrodes adapted to be placed in the said liquid, each electrode composed of a plurality of disc-shaped electrically connected metal members mounted in spaced apart relation and alternating to form a column of pairs of discs having its axis extending throughout the depth of the liquid to be measured, and a plurality of metal floats, one float placed between each pair of discs, said floats being adapted to float on the liquid level to be measured and changing their positions relative to the respective pair of discs in response to a change of the liquid level and thereby varying the capacitance values between the electrodes as a function of the liquid level.

5. In a liquid level measuring device, a transmitter of the capacitance type comprising an elongated metal member, means for supporting said member in a position extending throughout the depth of the liquid to be supervised, a fixed electrode composed of a plurality of electrically connected annular discs mounted concentrically on the member and electrically insulated therefrom and at spaced intervals, a second fixed electrode composed of a plurality of electrically connected annular discs, each one of the latter discs being mounted concentrically on the member and electrically insulated therefrom and between each two discs of the first named set but spaced therefrom, a plurality of metal ring floats, each ring float mounted on the member for free axial movement relative thereto and placed between each pair of discs, said ring floats being adapted to float on the liquid level to be measured and changing their positions relative to said discs in response to a change of the liquid level for varying the capacitance values between the electrodes as a function of the liquid level.

6. In a liquid level measuring device, a transmitter of the capacitance type, comprising a metal tube so mounted as to extend throughout the depth of the liquid to be supervised, a part of the tube submerged in liquid being closed, a fixed electrode composed of a plurality of electrically connected annular discs mounted concentrically on the tube, electrically insulated therefrom and located at spaced apart intervals therealong, a second fixed electrode composed of a plurality of electrically connected annular discs, each of the latter discs being mounted concentrically on the tube, electrically insulated therefrom and located between and spaced from each two discs of the first fixed electrode, each of said discs of both electrodes having portions extended into the tube but electrically separated therefrom, means within the tube for electrically connecting all the discs of the first electrode, means within the tube for electrically connecting all the discs of the second electrode, a plurality of ring floats of electric conducting material, each of said ring floats being mounted on the tube for free axial movement relative thereto and located between each pair of said discs, so that a disc forming a part of the first named fixed electrode will be immediately above each ring float and a disc of said second fixed electrode will be immediately below each ring float, said ring floats being adapted to float on the liquid level to be measured for changing their positions relative to the respective discs in response to a change of the liquid level and thereby for varying the capacitance values between the electrodes as a function of the liquid level, said discs being mounted on the tube in positions limiting movements of the floats in response to liquid level changes.

7. A transmitter as described in claim 5 in which the elongated member and the discs are mounted mutually perpendicular.

8. In a liquid level measuring device, a transmitter of the capacitance type comprising a fixed electrode adapted to be placed in the said liquid, a second fixed electrode adapted to be placed in the said liquid, one of said fixed electrodes having several sections arranged to form together with the other fixed electrode a plurality of open compartments, a plurality of conductive floats, one float placed in each of said compartments, said floats being adapted to float on the liquid level to be measured and changing their positions relative to said fixed electrodes in response to a change of the liquid level and thereby varying the capacitance values between the electrodes as a function of the liquid level, and an insulating layer coating all parts of the fixed electrodes which may come into contact with the liquid at the highest level thereof to be measured.

9. In a measuring device for measuring the level of a combustible liquid, a transmitter of the capacitance type comprising an elongated metal member, means for supporting said member in a position extending throughout the depth of the liquid to be supervised, a fixed electrode composed of a plurality of electrically connected annular discs mounted concentrically on the member, electrically insulated therefrom and arranged at intervals, a second fixed electrode composed of a plurality of electrically connected annular discs, each one of the latter discs being mounted concentrically on the member, electrically insulated therefrom and located between and spaced from each two discs of the first named set, a plurality of metal ring floats, each ring float being mounted on the member for free axial movement relative thereto and placed between each pair of discs, said ring floats being adapted to float on the liquid level to be measured and changing their positions relative to the respective discs in response to a change of the liquid level for varying the capacitance values between the electrodes as a function of the liquid level, and an insulating layer coating all parts of the elongated metal member and the discs in direct contact with the liquid.

10. A transmitter as described in claim 4, in which the annular discs are mounted on the elongated member slanted relative to the member axis, whereby a substantially uniform change of the capacitance values controlled by the relative discs and float positions is effected.

11. In a liquid level measuring device, a transmitter of the capacitance type, comprising a metal tube mounted in a position extending throughout the depth of the liquid to be supervised, the part of the tube submerged in liquid being closed, a plurality of ring-shaped fins mounted on the tube in positions slanted relative to the tube axis, a fixed electrode composed of a plurality of ring discs, each disc mounted concentrically on one of said fins and electrically insulated therefrom, a second fixed electrode composed of a plurality of ring discs, each of the latter discs mounted concentrically on one of said fins and electrically insulated therefrom, the discs of said second electrode being located between each two discs of the first fixed electrode and spaced therefrom, means within the tube for electrically connecting the discs of the first electrode, means within the tube for electrically connecting the discs of the second electrode, and a plurality of ring floats of electrically conductive material, each of said ring floats being mounted on the tube for free axial movement relative thereto and located between said discs, so that a disc forming a part of the first named fixed electrode will be immediately above each ring float and a disc of said second fixed electrode will be immediately below each ring float, said ring floats being adapted to float on the liquid, the level of which is to be measured and to change their positions relative to said discs in response to a change of the liquid level and thereby to vary the capacitance values between the electrodes as a function of the liquid level.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 2,258,613 | Kannenstine | Oct. 14, 1941 |
| 2,316,915 | Truman | Apr. 20, 1943 |

FOREIGN PATENTS

| Number | Country | Date |
|---|---|---|
| 350,791 | Great Britain | June 18, 1931 |
| 385,265 | Great Britain | Mar. 13, 1931 |
| 577,636 | France | June 7, 1924 |